Oct. 23, 1923. Re. 15,703
J. G. LEHMAN
TEMPERATURE CONTROL OF KETTLES BY ZONES
Original Filed Sept. 27, 1919
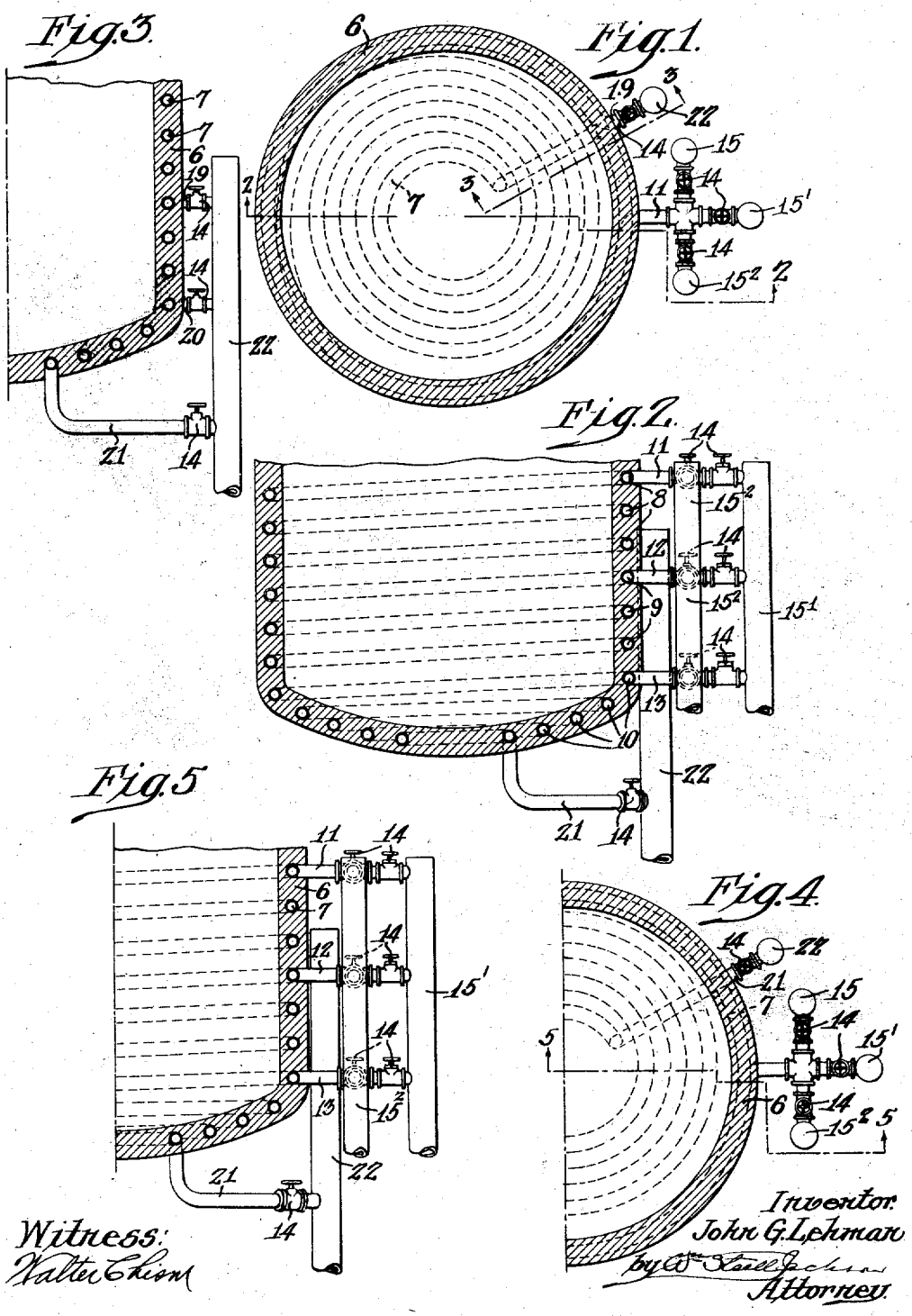

Reissued Oct. 23, 1923. Re. 15,703

UNITED STATES PATENT OFFICE.

JOHN GEORGE LEHMAN, OF BETHLEHEM, PENNSYLVANIA, ASSIGNOR TO BETHLEHEM FOUNDRY & MACHINE COMPANY, OF BETHLEHEM, PENNSYLVANIA, A CORPORATION OF PENNSYLVANIA.

TEMPERATURE CONTROL OF KETTLES BY ZONES.

Original No. 1,407,666, dated February 21, 1922, filed September 27, 1919, Serial No. 327,007. Now Reissue Patent No. 15,665, dated July 31, 1923, filed October 12, 1922, Serial No. 594,170. Divided and this application for reissue filed July 28, 1923. Serial No. 654,497.

*To all whom it may concern:*

Be it known that I, JOHN GEORGE LEHMAN, a citizen of the United States, residing at 244 E. Market Street, Bethlehem, in the county of Northampton and State of Pennsylvania, have invented a certain new and useful Temperature Control of Kettles by Zones, of which the following is a specification.

My invention relates to the heating or cooling of the walls of kettles and other receptacles, intended for the heat-treatment of liquids, particularly in carrying out chemical processes.

The purpose of my invention is to provide for different applications of heating or cooling fluid throughout different layers, belts or zones of a kettle.

A further purpose is to provide for heating one part of a liquid under treatment, at the same time that the heat is withdrawn from another part, or that the other part thereof is cooled, so as to give differential temperatures to the several parts thereof.

A further purpose of my invention is to provide a continuous passage, preferably a pipe coil, within the walls of a container for the purpose of applying heating or cooling fluid therein, and to tap the passage at intervals by inlet and outlet connections selected as may be desired so as to permit application of fluids to a part only of the passage.

Further purposes will appear in the specification and in the claims.

This application is a division of my application, Serial Number 594,170 for reissue of my Patent, No. 1,407,666 for temperature control of kettles by zones.

I have preferred to illustrate my invention by but one general form, selecting a form which is practical, efficient and inexpensive and which at the same time well illustrates the principles of my invention.

Figure 1 is a horizontal section showing one arrangement of connections for the practice of my invention.

Figure 2 is a vertical broken section taken upon line 2—2 of Figure 1.

Figure 3 is a broken vertical section upon line 3—3 of Figure 1.

Figure 4 is a horizontal section showing a second arrangement of connections.

Figure 5 is a broken vertical section upon line 5—5 in Figure 4.

In the drawings, similar numerals indicate like parts.

In many different lines of manufacture where heat-treatment of liquids is required, it is desirable to have the heat of the liquid under complete control, and my invention is directed to rapid, simple and effective control, differentiating between different layers or levels of the liquid being treated.

The container 6, generically called a kettle, is provided with a continuous passage within its walls, shown as pipes 7, in order that a fluid may be passed through them for the purpose of heating or cooling the walls of the kettle, and thus correspondingly heating or cooling the contents.

Without interfering with the use of the entire length of pipe 7 as one belt for continuous flow of liquid, I provide taps by which the passage may be arranged in groups of turns or belts of which I show three, at 8, 9 and 10, the passage being tapped at intervals to provide inlets and outlets seen in Figures 1–3.

In both of the forms, that shown in Figures 1–3 and that shown in Figures 4 and 5, the passage has inlets 11, 12 and 13 of which 12 and 13 forms the taps at desired intervals by which the limits of the belts are formed. Each of these inlets connects through a valve 14 with a plurality of general sources of fluid supply 15, 15′, 15², each available for any of the inlets and cut off from them selectively by the valves 14.

The two forms shown differ in that, in the first form, separate outlets are provided also at 19, 20 and 21, one for each belt; whereas in the form shown in Figures 4 and 5 a single outlet 21 only is provided.

The outlets connect with the main discharge pipe 22 and may be controlled to be open thereto or cut off therefrom by valves 14, one in each outlet.

In the second form it is necessary to use the lower belt whenever any of the belts are used, but one, two or three belts ranging from the bottom can be used as needed.

As it is desirable almost invariably to heat the lower part of the contents, whether the upper part is being heated or not, the single outlet form is ordinarily not objectionable and the additional outlets of the first form are not ordinarily necessary.

The general sources of supply can be suited in number and character to the needs of the particular installation, with or without separate outlets.

When the kettle has been filled with the liquid to be treated heating or cooling fluids can be supplied to any of the belts desired, together or with different temperatures in adjoining belts, giving great flexibility to the application of the heat treating and cooling fluids.

Having thus described my invention, what I claim as new and desire to secure by Letters Patent is:

1. In a device for treating liquids, a container having fluid passages in the solid walls thereof, adapted to form a continuous passage, and a plurality of points of inlet to and an outlet from said passages, all passing through the walls of the kettle at different points, in combination with controlled fluid supply for the inlets whereby fluid can be passed from any inlet to the outlet, thus passing through all or a portion only of said passages.

2. In a device for treating liquids, a container having continuous spirally arranged piping in the solid walls thereof surrounding the container, in combination with separately controlled inlets tapping the piping at intervals and passing through the walls at different points and an outlet therefor at one end of the piping, whereby fluid can be applied through all or a part only of said piping.

3. In a device for treating liquids, a container having continuous spirally arranged piping in the solid walls thereof surrounding the container, in combination with separate and separately controlled inlets and outlets tapping the piping at intervals, passing through the walls at different points, whereby fluid can be applied through all or any section of said piping.

4. In a device for treating liquids, a container having solid walls and within the walls having a continuous spiral passage, in combination with inlet connection at the top of the passage and at an intermediate point between the top and the bottom and outlet connection at the bottom and separately controlled means for inserting fluid at any of the inlets.

5. In a device for treating liquids, a container having solid walls and within the walls having a continuous spiral passage, in combination with inlet connection at the top of the passage and at an intermediate point between the top and the bottom and outlet connection at the bottom and separately controlled means for inserting fluid at any of the inlets and from any of a plurality of different sources of fluid supply.

JOHN GEORGE LEHMAN.

Witness:

C. DANIEL FRIEBELY.